United States Patent Office 3,391,000
Patented July 2, 1968

3,391,000
PROCESS FOR DETOXIFYING AND DEBITTERING THE SEEDS OF *CRAMBE ABYSSINICA*
Gus C. Mustakas, Peoria, and Larry D. Kirk, East Peoria, Ill., assignors to the United States of America as represented by the Secretary of Agriculture
No Drawing. Continuation-in-part of application Ser. No. 477,332, Aug. 4, 1965. This application Oct. 22, 1965, Ser. No. 502,718
5 Claims. (Cl. 99—2)

ABSTRACT OF THE DISCLOSURE

Process for detoxifying and debittering *Crambe abyssinica* meal comprising: heating said meal to a myrosinase-inactivating temperature of a least 180° F., then adding powdered sodium carbonate or sodium hydroxide, heating reactants to about 220–230° F. with direct steam, partially drying the product with indirect heat, and then discharging the product.

A nonexclusive, irrevocable, royalty-free license in the invention herein described, throughout the world for all purposes of the United States Government, with the power to grant sublicenses for such purposes, is hereby granted to the Government of the United States of America.

This invention, which is a continuation-in-part of our application S.N. 477,332, filed August 4, 1965, relates to a chemical process for detoxifying and debittering seed meals containing hydrolyzable thioglucosides and the bitter principal, sinapine, with existing oilseed processing equipment.

More particularly this invention relates to our further discovery that the flakes or meals prepared from the seed of *Crambe abyssinica* are extensively debittered and detoxified by reaction with not only ammonium hydroxide, as taught in our application S.N. 477,332, but now also by reaction with other alkaline compounds such as sodium hydroxide and especially by reaction with powdered sodium carbonate (commercial soda ash).

*Crambe asbyssinica* is a species of annual herb that is closely related to the mustard family. The proteinaceous seeds contain a highly valuable erucic acid-containing oil but also contain the bitter alkaloid sinapine and hydrolyzable thioglucosides that are objectionable because they liberate highly goitrogenic and systemcially harmful aglycones in the gut of chickens and domestic animals. In the absence of other vegetation, cattle and sheep on open range have eaten some of the uncultivated herb without apparent ill effect despite the bitterness of the seeds and their high content of hydrolyzable thioglucosides, the aglycone of the greatly predominating thioglucoside being capable of spontaneously converting cyclization mainly to a 5-vinyloxazolidine-2-thione, which thiooxazolidone-type compound appears to be substantially detoxified by ruminants but is known to be goitrogenic and even fatal, especially to newly hatched or very young chickens, thus preventing any successful use of the undetoxified, undebittered seeds or seed residues as an inexpensive protein supplement for domestic animals and especially for the acutely sensitive younger poultry.

As a result of the very recent discovery that the erucic acid-containing oil present in the seed of *C. abyssinica* is quite superior to other vegetable oils as a mold lubricant for the continuous casting of steel, it is likely that *C. abyssinica* will soon be extensively cultivated mainly for its oil, thereby necessitating a disposal of the high protein defatted meal. However, as already indicated, neither the full fat nor the defatted crambe meal can be expected to gain acceptance in feeds for chickens unless detoxified, nor for use in livestock feeds unless debittered.

As pointed out in our application S.N. 477,332, the hexane-defatted crambe seedcake contains about 9 percent of a thioglucoside whose free aglycone, presumably 2 - hydroxy - 3 - butenyl isothiocyanate, spontaneously cyclizes to a nonvolatile thiooxazolidone-type compound that appears to be detoxified by ruminants but is known to be goitrogenic and highly toxic to chickens. Thus, if *C. abyssinica* is to achieve its maximum potential as a replacement crop in competition with other oilseeds such as those of cotton, soybeans, peanuts, etc., where the income from the oil is supplemented by that from the sale of poultry and livestock feed additives, it is necessary to inexpensively detoxify and debitter the defatted crambe flakes or meals. The same requirements will, of course, apply to full-flat meals from any acreage in substantial excess of those capable of fully supplying the demands for the oil.

Although the enzymatic process taught in U. S. Patent No. 3,173,792 hydrolyzes the thioglucosides, the enzyme does not act on the sinapine, which bitter alkaloid apparently is only slightly inactivated or destroyed by the conventional steam desolventizing or toasting steps. Thus, the resulting meal is not entirely satisfactory as a protein supplement for livestock.

The chromatographic evidence as to the absence of thioglucosides or thiooxazolidone derivative in the ammonia-treated crambe meal of our copending application S.N. 477,332 was strikingly confirmed therein by the normal thyroids and survival of all twenty of the day-old experimental chicks fed for 28 days on a corn-soya ration containing 20 percent of the ammoniated crambe meal. Likewise, an accompanying substantially complete destruction of sinapine therein was shown by the extinction of all but an extremely faint residual fluorescene on developed chromatograms of the treated meal under U. V. light. However, it has now been indicated by several commercial processors of vegetable oils and meals that they are disinclined to revamp their equipment as apparently would be required in order to efficiently use the pressurized ammonia process of S.N. 477,332.

The principal object of this invention is the provision of an inexpensive and highly effective process for chemically debittering and at the same time converting, inactivating, or removing the potentially toxic thioglucosides from full-fat flakes or defatted meals of *C. abyssinica* and other thioglucoside-containing seeds such as those of rape.

A more specific object is the provision of a process whereby oil-containing flakes or defatted crambe meals or press cakes are substantially debittered and detoxified without special equipment and without the risk of ammonia fumes by reacting the heat-inactivated moisturized crambe with a nonirritating alkaline material, preferably powdered soda ash (sodium carbonate), although it is likely that any distinctly alkaline salt or any caustic solution would be operative for the purposes of our invention.

Another object is the provision of an inexpensive process for debittering and detoxifying the full-fat flakes of crambe or of other thioglucoside-containing herbs without contaminating the oils with traces of sulfur-containing catalyst poisons that would prevent subsequent hydrogenation of the oil.

In accordance with the objects of the instant invention we have now discovered that the reaction at moderately elevated temperatures of about 2 percent based on the dry weight of meal of powdered sodium carbonate or other alkaline salt with heat-inactivated moist crambe flakes or meal effectively debitters and detoxifies the said seed material so that it is usable as a palatable supplement in livestock feeds and a nontoxic supplement in poultry feeds.

It is apparent that many minor or obvious alterations can be made in the choice of alkali salt or of caustic solution and in the precise operating conditions without departing from the spirit of the invention as illustrated by the following preferred embodiments.

EXAMPLE 1

Several hundred pounds of *Crambe abyssinica* seed were dehulled, the hulls aspirated, the dehulled seeds cracked between corrugated rolls gapped at 0.060 inch, and the cracked seeds flaked by a single passage between smooth rolls. An intense fluorescence under U.V. light of the chromatogram spots (principal spot $R_f$ 0.4) from a 4:1:4 n-butanol-ethanol-water solvent system confirmed the presence of about 0.5 percent of sinapine and several unidentified minor alkaloids. A Wetter analysis of the flakes after myrosinase activation showed a 1.66 percent content of 5-vinyloxazolidine-2-thione, and a gravimetric sulfate analysis on the defatted flakes indicated a total thioglucoside content of 9.48 percent. Two hundred pounds of the untreated flakes were placed in a steam-jacketed cooker equipped with a ribbon agitator. Four pounds of finely powdered sodium carbonate were intimately mixed with the flakes and the dry mixture was rapidly heated to approximately 220° F. by indirect steam to destroy the myrosinase and thereby prevent any deleterious hydrolysis of the thioglucosides. Then the moisture content of the flakes was raised to 22 percent by the addition of 53 pounds of water, and the contents directly heated for 40 minutes at 220–230° F. by the addition of sparge steam through the agitator shaft. Then the direct steam was stopped and the flakes were subjected to indirect heat for 45 minutes. The partially dried flakes as discharged from the cooker contained 16 percent moisture and were air dried. Analysis of the meal showed a nitrogen value of 6.79 percent, a zero content of thioglucoside and a zero thiooxazolidone value, and an 0.04 percent content of sinapine.

For cattle acceptance tests, 6.2 pounds of the sodium carbonate treated Crambe flakes were blended with each 93.8 pounds of a soybean-shelled corn-corncob ration also containing salt and trace minerals. Rations were also prepared that were identical excepting for respective substitutions of either the sodium hydroxide treated defatted meal of Example 2 or of Crambe meal that was merely toasted and consequently analyzed 0.78 percent thiooxazolidone and gave a chromatogram that was strongly positive for sinapine under U.V. light.

Convenient and identical quantities of the above rations, sequentially identified as A, B, and C, were placed in adjoining feed bins and four unrestrained steers were permitted to eat ad libitum for 15 days, the bins being replenshed daily and the consumptions recorded. As shown in Table 1, the average and daily consumption per steer of Ration A was 2.7 times as much as that of Ration C, and the daily consumption of Ration B was about 2.3 times that of Ration C. Thus, it is clear that the reliability of the substantially complete disappearance of the sinapine fluorescence is strongly confirmed by the cattle feeding tests, just as the Wetter assay for thiooxazolidine compound and gravimetric sulfate test for thioglucosides were confirmed by the chick feeding results of the parent application.

Table 1

| Test Ration: | Average daily consumption, pounds per steer |
|---|---|
| Comprising Na$_2$CO$_3$-treated Crambe | 9.83 |
| Comprising NaOH-treated Crambe | 8.27 |
| Comprising toasted Crambe | 3.63 |

EXAMPLE 2

Defatted Crambe meal was prepared by cracking whole Crambe seed (same acquisition as used in Example 1) through corrugated rolls set at 0.060-inch clearance, aspirating the hulls, heating to 200° F. with indirect steam to inactivate the enzyme, pressing in a continuous screw press to an oil content of 20 percent, extracting with hexane to a residual oil content of 0.7 percent, and flash desolventizing the entrained hexane. Approximately 115 pounds of the defatted meal was then placed in a steam jacketed cooker equipped with a ribbon agitator. The charge was heated to 175° F. with live steam. Then 28.5 pounds of water containing 2.3 pounds of dissolved sodium hydroxide was added to adjust the meal moisture content to 24 percent and introduce the caustic. After sparging for 15 minutes, the treated meal was partially dried by exposure to 45 minutes of indirect heat. Then the meal was discharged and air dried. Analysis of the meal showed a nitrogen value of 6.67 percent, 0.12 percent of thiooxazolidone (Wetter procedure), and 0.11 percent sinapine, consistent with a slight residual fluorescence of the developed chromatogram under ultraviolet light. As with the soda ash-treated flakes of Example 1, the above sodium hydroxide-treated defatted Crambe meal was incorporated at the level of 6.2 percent in the otherwise identical ration used in Example 1 and offered concurrently therewith (as ration B) to the same steers. The average daily consumption of ration B per animal was 8.27 pounds.

EXAMPLE 3

240 pounds of whole Crambe seed (same seed accession as in Example 1) was heated to 200° F. to inactivate the myrosinase and pressed in a continuous screw press to give 200 pounds of press cake having a residual oil content of 25 percent. The press cake was defatted with hexane at 140° F. to less than 1 percent of residual oil, and the meal was air dried to remove residual solvent. To 25 pounds of defatted meal in a 1 cu. ft. cooker having a ribbon agitator was added 0.83 pound of finely ground sodium carbonate. The charge was heated to 185° F. by means of indirect steam, moistened to a level of 18 percent by the addition of 4 pounds of water, steamed with sparge steam for 40 minutes at 230° F., partially dried with indirect steam, and discharged from the cooker. Analysis of the meal showed no thioglucoside, no sinapine fluorescence, and no thiooxazolidone.

We claim:

1. A process for greatly improving the palatability of *Crambe abyssinica* meals and flakes to cattle comprising:
    (a) heating the said crambe material in the absence of added moisture to a myrosinase-inactivating temperature of at least about 180° F.;
    (b) adding about 2 percent based on the weight of the Crambe of an alkaline reactant selected from the group consisting of powdered sodium carbonate and sodium hydroxide in the form of an aqueous solution along with sufficient water to raise the moisture content to about 22 percent;
    (c) heating the reactants for about 40 minutes at about 220–230° F. with direct steam;
    (d) partially drying the product with indirect heat;
    (e) and discharging the product to the atmosphere.

2. The process of claim 1 wherein the alkaline reactant is powdered sodium carbonate.

3. The process of claim 1 wherein the alkaline reactant is sodium hydroxide in the form of an aqueous solution.

4. A cattle feed comprising at least about 6 percent based on its total weight of *Crambe abyssinica* flakes that have been treated by the process of claim 1.

5. A ration for cattle comprising about 6.2 percent by weight of the product produced by the process of claim 1, the remainder of said ration comprising a cattlefeed mixture of shelled corn, corncobs, and soybeans.

References Cited

UNITED STATES PATENTS

| 3,173,792 | 3/1965 | Mustakas et al. | 99—2 |
| 3,294,776 | 12/1966 | Layton et al. | 99—17 |

A. LOUIS MONACELL, *Primary Examiner.*

N. ROSKIN, *Assistant Examiner.*